United States Patent
Veltri et al.

(10) Patent No.: US 10,670,258 B2
(45) Date of Patent: Jun. 2, 2020

(54) ILLUMINATED MIRROR

(71) Applicant: Hubbell Incorporated, Shelton, CT (US)

(72) Inventors: Thomas Veltri, Simpsonville, SC (US); Dhavalkumar Patel, Greer, SC (US)

(73) Assignee: Hubbell Incorporated, Shelton, CT (US)

( * ) Notice: Subject to any disclaimer, the term of this patent is extended or adjusted under 35 U.S.C. 154(b) by 98 days.

(21) Appl. No.: 15/970,198

(22) Filed: May 3, 2018

(65) Prior Publication Data
US 2018/0320887 A1 Nov. 8, 2018

Related U.S. Application Data

(60) Provisional application No. 62/502,135, filed on May 5, 2017, provisional application No. 62/545,602, filed (Continued)

(51) Int. Cl.
F21V 33/00 (2006.01)
F21V 7/10 (2006.01)
(Continued)

(52) U.S. Cl.
CPC ............ *F21V 33/004* (2013.01); *A45D 33/32* (2013.01); *A45D 42/10* (2013.01); *A45D 42/16* (2013.01); *F21V 7/10* (2013.01); *G02B 5/08* (2013.01); *F21W 2131/302* (2013.01); *F21Y 2115/10* (2016.08)

(58) Field of Classification Search
CPC ......... F21V 33/004; F21V 7/10; A45D 33/32; A45D 42/10; A45D 42/16; G02B 5/08; F21Y 2115/10; F21W 2131/302
See application file for complete search history.

(56) References Cited

U.S. PATENT DOCUMENTS 4,479,172 A * 10/1984 Connor .................. B60J 3/0282
362/135
D536,881 S 2/2007 Mischel, Jr.
(Continued)

FOREIGN PATENT DOCUMENTS

CN 202135863 U * 2/2012
CN 206079492 U 4/2017
(Continued)

OTHER PUBLICATIONS

PCT/US2018/045100 International Search Report dated Oct. 4, 2018 (1 page) (Year: 2018).*
(Continued)

*Primary Examiner* — Anh T Mai
*Assistant Examiner* — Glenn D Zimmerman
(74) *Attorney, Agent, or Firm* — Michael Best & Friedrich, LLP

(57) ABSTRACT

An illuminated vanity mirror includes a housing and a front mirror panel connected to the housing. A frame is connected to the housing and positioned behind the front mirror panel. A light emitter is connected to frame. The light emitter includes a plurality of LEDs facing away from the front mirror panel. The LEDs are positioned to direct emitted light toward the housing and the emitted light is redirected through the front mirror panel.

19 Claims, 13 Drawing Sheets

Related U.S. Application Data on Aug. 15, 2017, provisional application No. 62/547,150, filed on Aug. 18, 2017, provisional application No. 62/595,730, filed on Dec. 7, 2017.

(51) Int. Cl.
*A45D 33/32* (2006.01)
*G02B 5/08* (2006.01)
*A45D 42/10* (2006.01)
*A45D 42/16* (2006.01)
*F21Y 115/10* (2016.01)
*F21W 131/302* (2006.01)

(56) References Cited

U.S. PATENT DOCUMENTS

| | | |
|---|---|---|
| D544,219 S | 6/2007 | Mischel, Jr. |
| D545,067 S | 6/2007 | Mischel, Jr. |
| D545,574 S | 7/2007 | Mischel, Jr. |
| D545,575 S | 7/2007 | Mischel, Jr. |
| D546,073 S | 7/2007 | Mischel, Jr. |
| D546,566 S | 7/2007 | Mischel, Jr. |
| D547,071 S | 7/2007 | Mischel, Jr. |
| D547,072 S | 7/2007 | Mischel, Jr. |
| D547,073 S | 7/2007 | Mischel, Jr. |
| D552,358 S | 10/2007 | Mischel, Jr. |
| D552,359 S | 10/2007 | Mischel, Jr. |
| D552,360 S | 10/2007 | Mischel, Jr. |
| D559,553 S | 1/2008 | Mischel, Jr. |
| D559,555 S | 1/2008 | Mischel, Jr. |
| D559,557 S | 1/2008 | Mischel, Jr. |
| D559,558 S | 1/2008 | Mischel, Jr. |
| D579,671 S | 11/2008 | Mischel, Jr. |
| D591,054 S | 4/2009 | Erickson |
| D595,511 S | 7/2009 | Mischel, Jr. |
| D620,718 S | 8/2010 | Mischel, Jr. |
| 7,853,414 B2 | 12/2010 | Mischel, Jr. |
| 8,356,908 B1 * | 1/2013 | Zadro .................... A45D 42/10 362/135 |
| D689,701 S | 9/2013 | Mischel, Jr. |
| D704,938 S | 5/2014 | Mischel, Jr. |
| D704,939 S | 5/2014 | Mischel, Jr. |
| 9,765,958 B2 * | 9/2017 | Lumaye .............. F21V 33/0004 |
| 2007/0159316 A1 | 7/2007 | Mischel |
| 2008/0212218 A1 | 9/2008 | Mischel |
| 2009/0231836 A1 | 9/2009 | Mischel |
| 2014/0066048 A1 | 3/2014 | Swedenburg |
| 2016/0070085 A1 | 3/2016 | Mischel, Jr. |
| 2016/0255941 A1 | 9/2016 | Yang et al. |
| 2016/0327787 A1 | 11/2016 | Mischel, Jr. |
| 2018/0003971 A1 | 1/2018 | Mischel, Jr. |

FOREIGN PATENT DOCUMENTS

| | | |
|---|---|---|
| EP | 2615948 B1 | 7/2013 |
| WO | 2017062776 A1 | 4/2017 |

OTHER PUBLICATIONS

PCT/US2018/030822 International Search Report and Written Opinion dated Jul. 19, 2018 (13 pages).

* cited by examiner

ILLUMINATED MIRROR

RELATED APPLICATION(S)

This application is based on U.S. Provisional Application Ser. No. 62/502,135, filed May 5, 2017, U.S. Provisional Application Ser. No. 62/545,602, filed on Aug. 15, 2017, U.S. Provisional Application Ser. No. 62/547,150, filed on Aug. 18, 2017, and U.S. Provisional Application Ser. No. 62/595,730, filed on Dec. 7, 2017, the disclosures of which are incorporated herein by reference in their entirety and to which priority is claimed.

FIELD

Various exemplary embodiments relate to illuminated mirrors, for example vanity mirrors.

BACKGROUND

Illuminated mirrors are frequently used in bathrooms, powder rooms, and bedrooms.

SUMMARY

According to an exemplary embodiment, an illuminated vanity mirror includes a housing and a front mirror panel connected to the housing. A frame is connected to the housing and positioned behind the front mirror panel. A light emitter is connected to frame. The light emitter includes a plurality of LEDs facing away from the front mirror panel. The LEDs are positioned to direct emitted light toward the housing and the emitted light is redirected through the front mirror panel.

According to another exemplary embodiment, an illuminated vanity mirror includes a housing having a rear wall and a set of outer walls extending from the rear wall to define an interior compartment. A front mirror panel is connected to the housing. A frame is positioned in the interior compartment. The frame has a side wall oriented at an oblique angle to the rear wall and to the front mirror panel. A light emitter is connected to the side wall. The light emitter includes a plurality of LEDs facing away from the front mirror panel. The LEDs are positioned to direct emitted light toward the housing. The emitted light is reflected away from the housing toward the front mirror panel.

According to another exemplary embodiment, an illuminated vanity mirror includes a housing defining an interior compartment. A front mirror panel is connected to the housing. A frame is positioned in the interior compartment. The frame has a first side wall oriented at an oblique angle to the rear wall and to the front mirror panel. A light emitter is connected to the first side wall. The light emitter includes a plurality of LEDs facing away from the front mirror panel. The LEDs are positioned to direct emitted light toward the housing. The emitted light is mixed prior to being passing through the front mirror panel to be substantially free of pixilation.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

The switch to light emitters utilizing light emitting diodes (LEDs) brings unique challenges to creating a desired light output. Instead of traditional light sources that utilize a single point of light, LEDs utilize multiple smaller light sources spread out over an area. At close distances this can create a pixelated light output as viewed by a user. To overcome this problem, diffuser lenses or other optical components are typically used to spread out the light. Diffuser lenses, however, must still be spaced a certain distance from the LEDs to eliminate pixilation. The use of such diffuser lenses adds additional components and additional mounting and spacing considerations that can cause design problems and constraints, especially when used in housings with limited space. The end result is typically light housing with larger footprints.

Larger light housings can be problematic when used in areas where space is a priority. One example of such an area is bathrooms, bedrooms, or powder rooms that have an illuminated vanity mirror. FIGS. 1-5 show an exemplary embodiment of an illuminated vanity mirror 10 that overcomes these problems.

Figure 1:
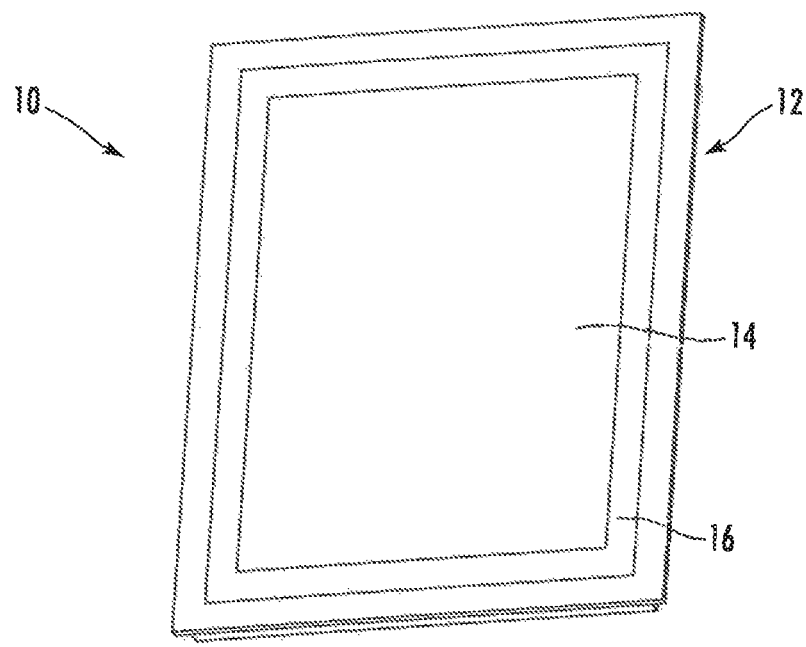
FIG. 1 is a front perspective view of an exemplary illuminated vanity mirror having a housing and a front mirror panel.

As best shown in FIG. 1, the mirror assembly 10 includes a front panel 12 that includes one or more sections, for example a central section 14 and one or more outer sections 16. The central section 14 can be a mirrored glass surface, and one or more of the outer sections 16 can be frosted glass. The outer sections 16 can have different surface features of levels of opacity.

Figure 2:
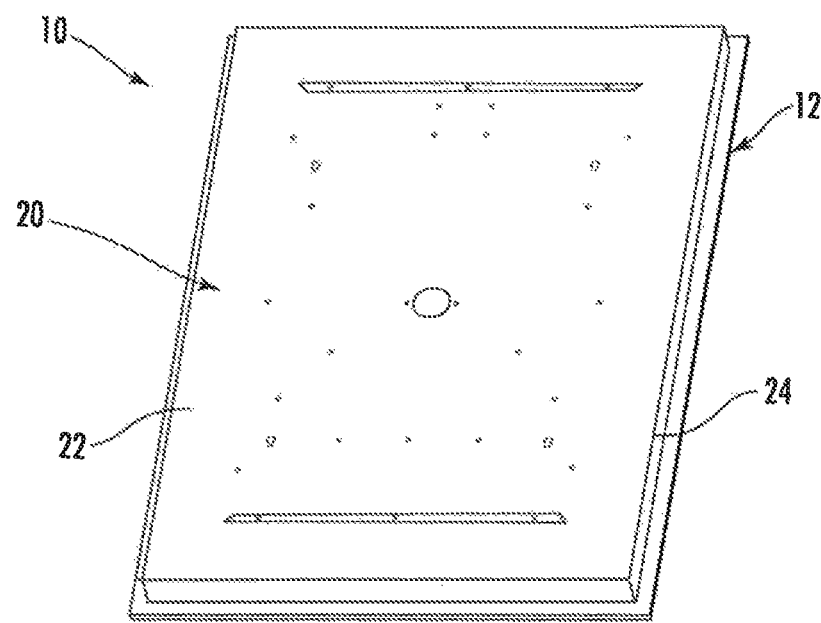
FIG. 2 is a rear perspective view of FIG. 1 showing the housing.

As best shown in FIG. 2, the front panel 12 is connected to a mirror housing 20 that includes a rear wall 22 and a series of outer walls 24 extending from the rear wall 22. The mirror housing 20 has a central conduit that receives one or more conductors for providing power to the light emitters positioned in the housing. Surface mounting features, such as openings and keyhole slots are provided on the rear wall 22 to enable the mirror 10 to be hung from a support, such as a wall. One or more control components (e.g. drivers, sensors, communication module, control module, fuse, surge protector, fault protection) can be connected to the rear wall 22 inside the interior.

Figure 3:
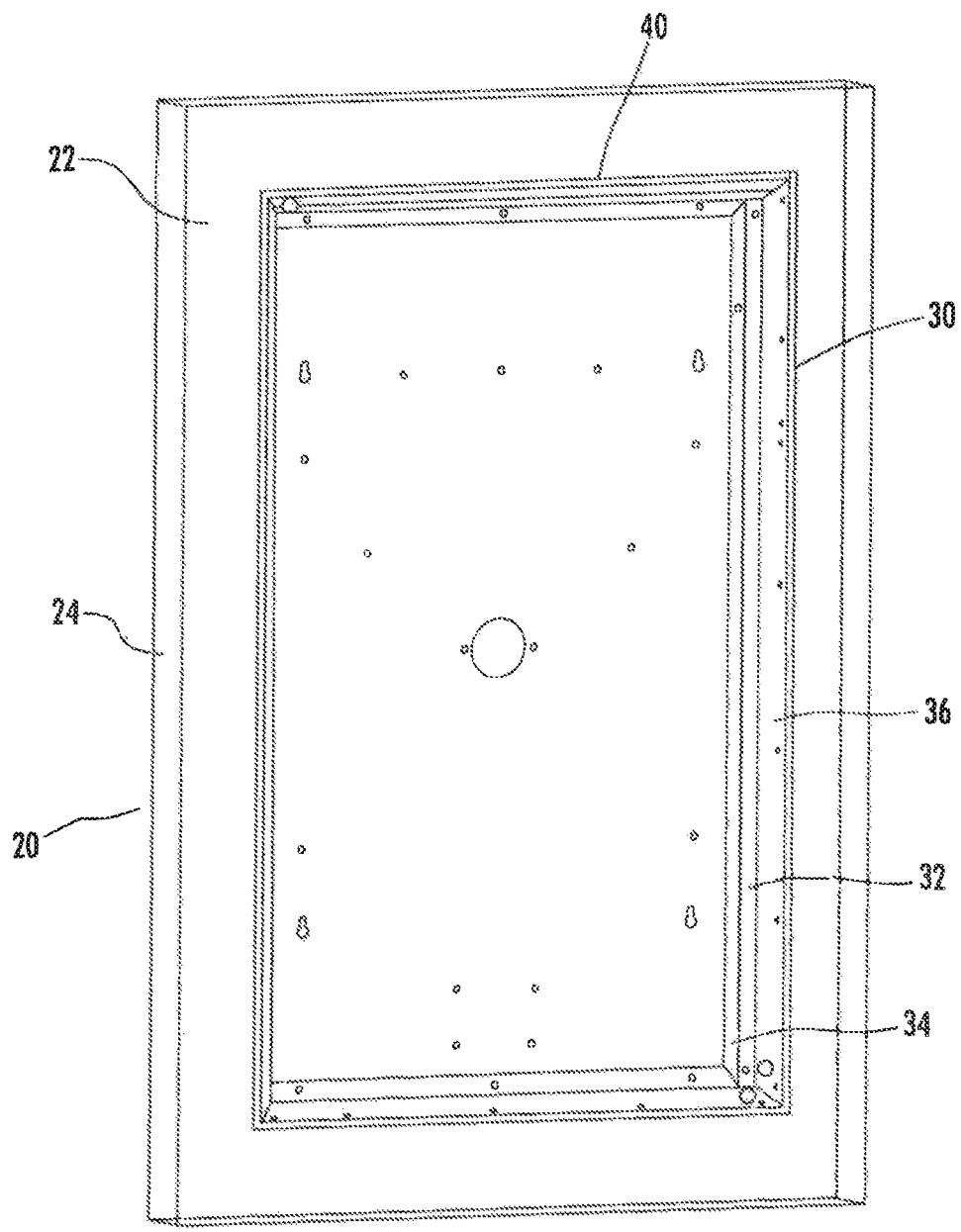
FIG. 3 is a front perspective view of FIG. 1 with the mirror removed showing the interior of the housing and a frame.
Figure 4:
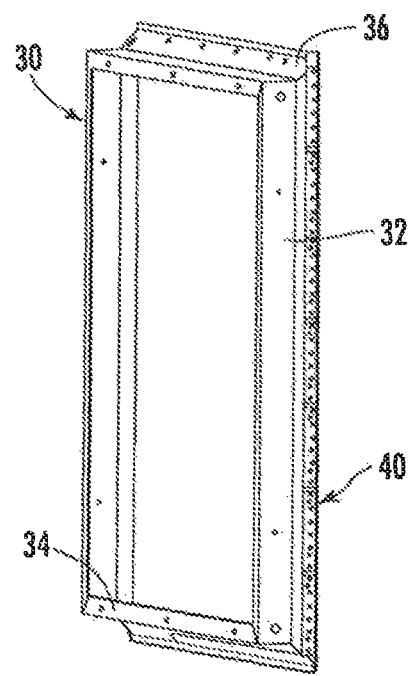
FIG. 4 is a rear perspective view of the exemplary frame of FIG. 3.
Figure 5:
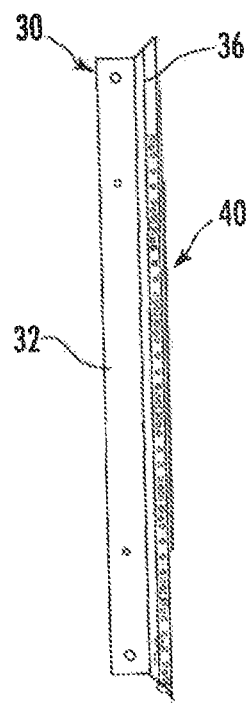
FIG. 5 is a side view of the frame of FIG. 4.
Figure 6:
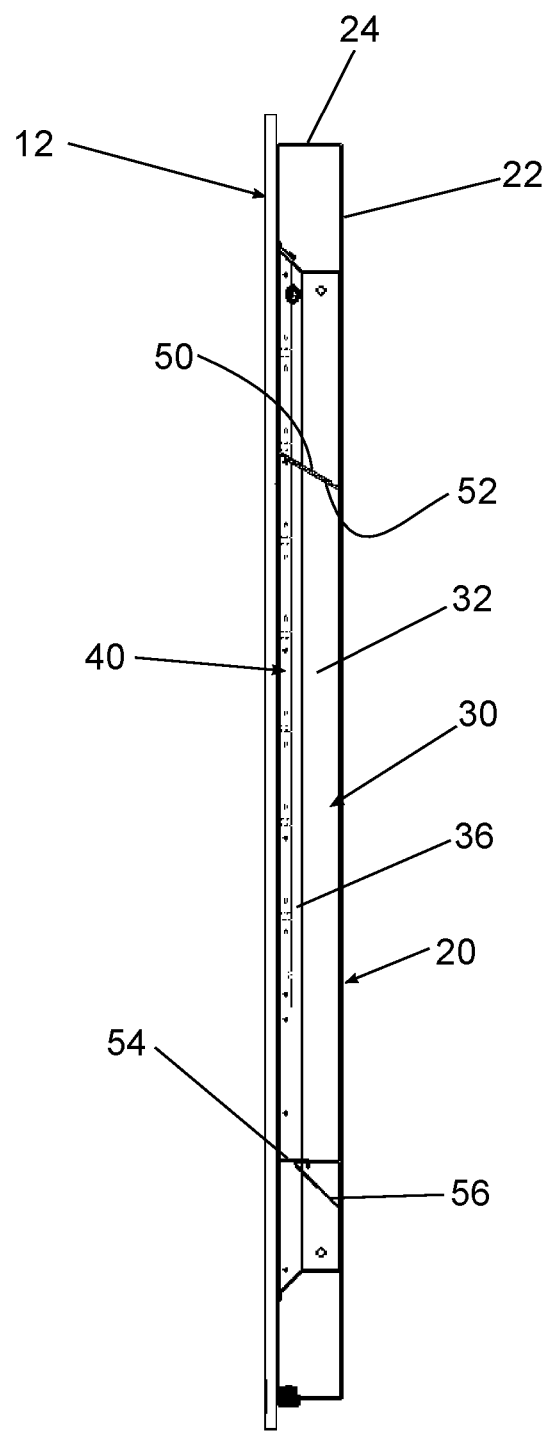
FIG. 6 is a side, sectional view of FIG. 1 showing the frame positioned in the housing.

FIGS. 3-5 show a frame 30 that can be connected to the mirror housing 20. Each side of the frame 30 includes a first side wall 32. A flange 34 extends from the first side wall 32 and can receive one or more fasteners to connect the frame 30 to the mirror housing 20. A second side wall 36 extends at an oblique angle to the first side wall 32. The mirror housing 20 and frame 30 are illustrated as having a rectangular shape, however different sizes and shapes can also be used.

One or more light emitters 40 are connected to the second side wall 36. In an exemplary embodiment, the light emitters 40 include a plurality of LEDs connected to the printed circuit board (PCB). Various configurations of the light emitters 40 can be used depending on the desired light output. For example, light emitters 40 can extend the entire distance along each side (top, bottom, left, and right) of the second side walls 36, extend the entire distance on one or more of the second side walls 36, or extend partially along one or more of the second side walls 36. The LEDs are positioned at an angle to the front panel 12 and the rear wall 22, and are facing away from the front panel 12. This allows the emitted light to strike at least one of the rear wall 22 and the outer walls 24 of the mirror housing 20 before being reflected back to the front panel 12. By the time the light reaches the front panel 12, the light output has mixed enough to eliminate pixilation of the light as viewed by the user.

Mixing the emitted light prior to it emerging through the front panel 12 eliminates the need for separate diffuser lenses, saving space and allowing for a smaller profile mirror housing 20. In certain embodiments, the position and orientation of the LEDs is configured so that light will strike the rear wall 22 and at least one of the side walls 24 prior to being emitted from the front panel 12. Also, the light will strike the rear wall 22 outside of the frame 30, and the size and configuration of the frame can be used to control the light output and help to prevent light from bleeding into the interior of the front panel 12. In other embodiments reflectors or other light baffles separate from the housing 20 can be positioned in the frame to reflect or assist in mixing the emitted light prior to it exiting the front panel 12 to eliminate pixilation.

Figure 7:
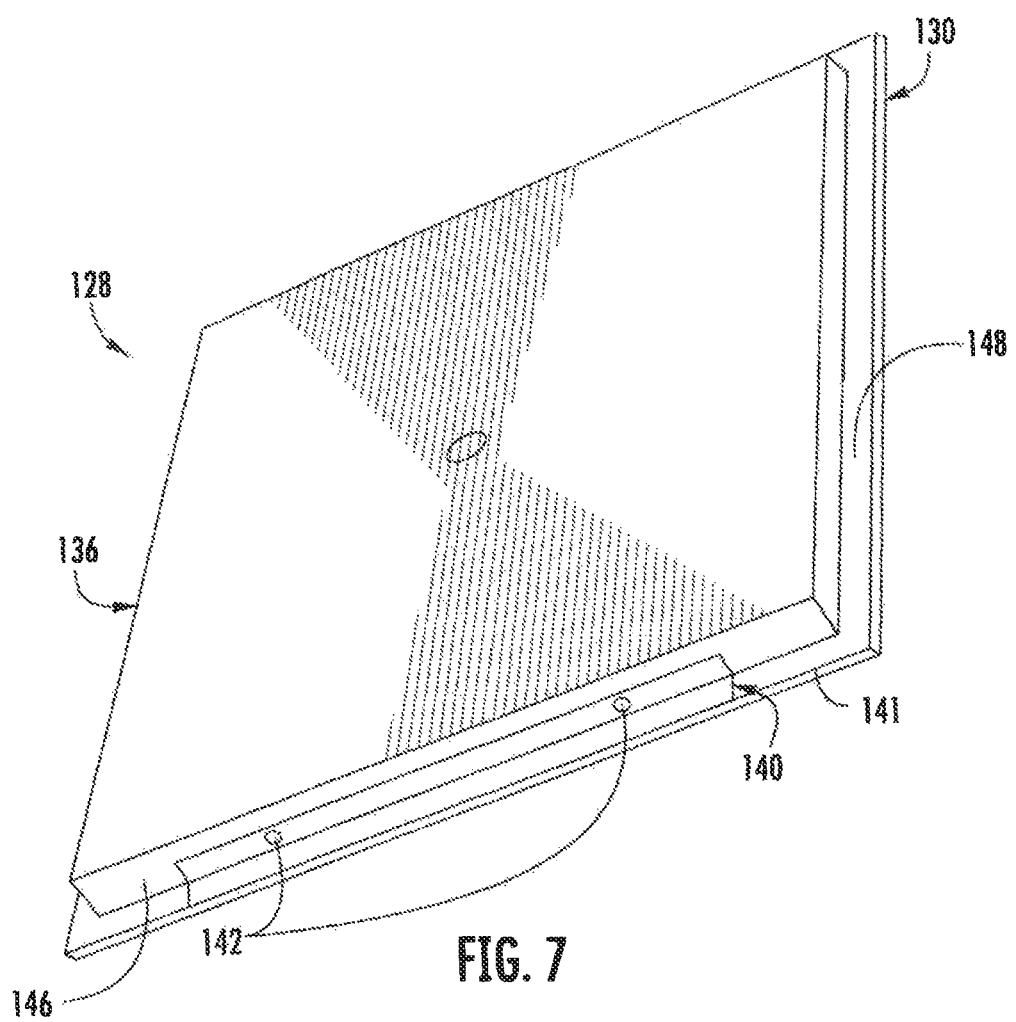
FIG. 7 is a bottom perspective view of an exemplary illuminated vanity mirror showing the connection between a second mount and the bottom wall of the housing.
Figure 8:
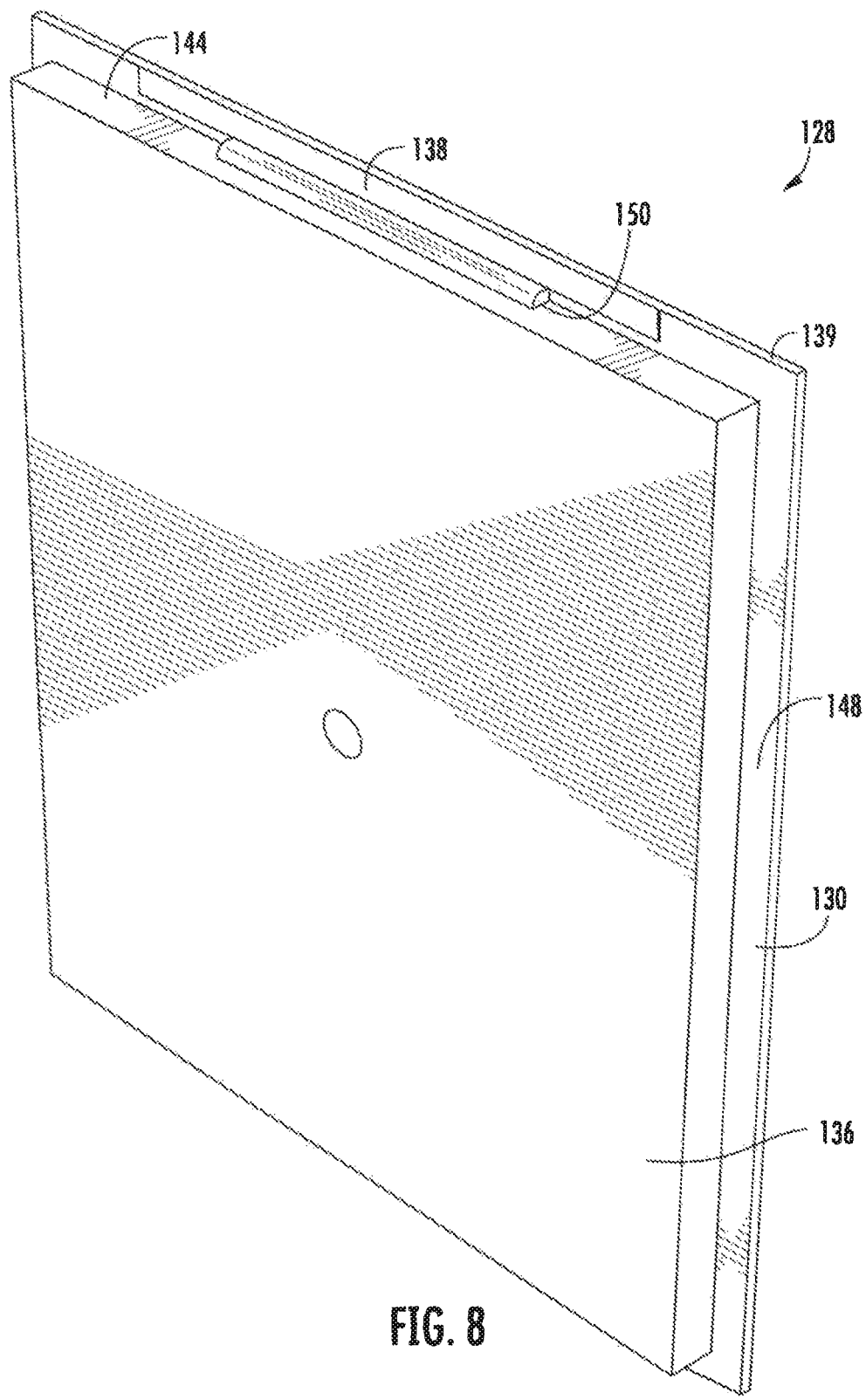
FIG. 8 is a top perspective view of FIG. 7 showing the connection between a first mount and the top wall of the mirror housing.

FIGS. 7-15 depict various exemplary mounting configurations for the illuminated vanity mirror. FIG. 7 depicts a perspective view of one another exemplary embodiment of the illuminated vanity mirror assembly 128 where the bottom portion of the assembly is visible. FIG. 8 depicts a perspective view of the same embodiment of the illuminated vanity mirror assembly 128 where the top portion of the assembly is visible.

A first mount 138 and a second mount 140 are attached to the rear surface 148 of the front panel 130. The first mount 138 is attached at or adjacent to a first edge 139 of the rear surface 148 of the front panel 130 and the second mount 140 is attached at or adjacent to a second edge 141 (e.g., opposite edge) of the rear surface of the front panel. In the embodiment shown in FIGS. 7 and 8, the first edge 139 corresponds to a top edge of the rear surface 148 of the front panel 130 and the second edge 141 corresponds to a bottom edge. However, in other embodiments, the first edge 139 may correspond to a bottom edge of the rear surface 148 of the front panel 130 and the second edge 141 may correspond to a top edge. These attachments may be accomplished through a variety of ways, including, but not limited to, fasteners, adhesives, snap connections, or other connection methods. Alternatively, in some embodiments, the first and/or second mount(s) 138, 140 may be formed integrally with the rear surface 148 of the front panel 130.

The mirror housing 136 can possess a first wall 144 (e.g., a first edge member) and a second wall 146 (e.g., a second edge member). The first wall 144 and the second wall 146 can be located on a perimeter of the mirror housing 136. The first wall 144 and the second wall 146 can at least partially define a perimeter of the mirror housing 136. In the example embodiment shown FIGS. 7 and 8, the first wall 144 is a top wall of the mirror housing 136 and the second wall 146 is a bottom wall of the mirror housing. However, in other embodiments, the first wall 144 can be the bottom wall and the second wall 146 can be the top wall.

Figure 9:
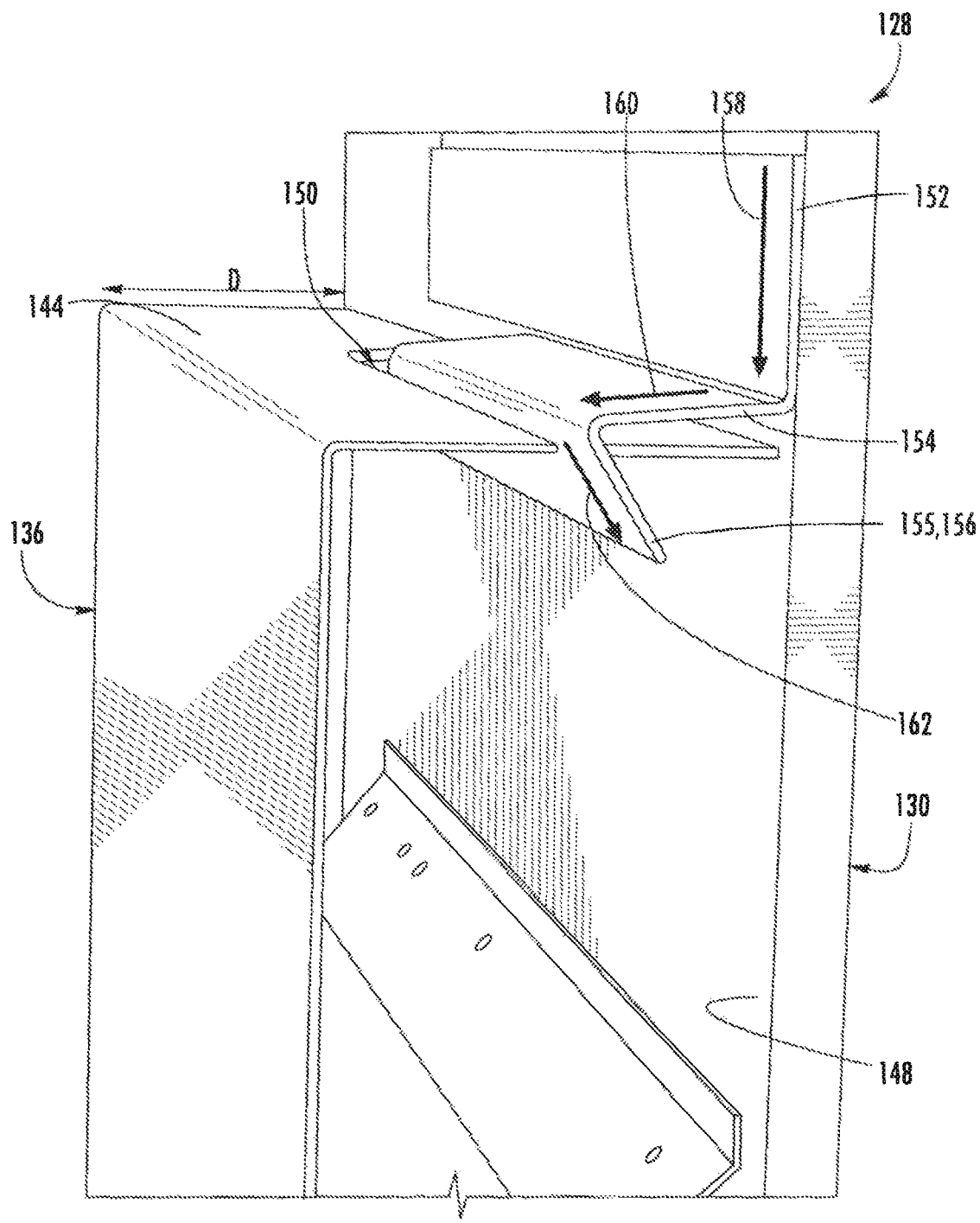
FIG. 9 is a perspective, cross-sectional view of an embodiment of the assembly showing the connection between the first mount and a top wall of the housing.

The first wall 144 can define a cavity 150 (e.g., recess, opening, through hole, etc.). A portion of the first mount 138 can be physically received within the cavity 150 of the first wall 144. In FIG. 9, a downward facing lip 155 on the first mount 138 is the portion that can be physically received within the cavity 150. In some embodiments, the cavity 150 can be of a size and shape that is sufficiently large so that a portion of the first mount 138 may be received within the cavity but small enough to secure a portion of the first mount in a fixed position. By securing the first mount 138, the attached front panel 130 may also be held in a fixed position or a relatively fixed position.

As shown in FIG. 7, the second wall 146 of the mirror housing 136 can abut the second mount 140. The second wall 146 can be connected or attached to the second mount 140. In FIG. 7, fasteners 142 are used to connect the second mount 140 to the second wall 146 of the mirror housing 136. In some embodiments, the fasteners 142 can be screws that extend through holes within the second mount 140 and the second wall 146. However, other fasteners may be used without deviating from the scope of the present disclosure, such as a snap connection, nuts and bolts, etc. In FIG. 7, two fasteners 142 are used, but more or fewer fasteners may be used.

In some embodiments, the fasteners 142 can be spaced evenly along the second mount 140, but the fasteners may secure the second mount and the second wall 146 at any location along the second mount. In an example embodiment, the mirror housing 136 will rest on top of the second mount 140 and the fasteners 142 will be applied to secure the mirror housing and the second mount 140 together. However, in other embodiments, the second mount 140 may rest on top of the mirror housing 136 and one or more fastener(s) may be applied to secure mirror housing 136 and the second mount 140 together. In addition to or as an alternative to applying fasteners 142 to a second wall 146, fasteners may be applied to side walls or other surfaces of the mirror housing 136 to secure the front panel 130.

FIG. 9 depicts a perspective, cross-sectional view of the assembly so that the connection between the first mount 138 and the cavity 150 defined within the first wall 144 of the mirror housing 136 can be seen more clearly. The first mount 138 has a downward facing lip 155 that is received within the cavity 150.

In the embodiment shown in FIG. 9, the first mount 138 possesses a first portion 512, a second portion 154, and a third portion 156. The first portion 152 extends in a first direction 158 as indicated by the arrow in FIG. 9 and is attached to the rear surface 148 of the front panel 130. As shown in FIG. 9, this first direction 158 is vertically downward. The second portion 154 extends in a second direction 160 as indicated by the arrow in FIG. 9. This second direction 160 is different from the first direction 158. In the embodiment shown in FIG. 9, the second direction 160 is in a horizontal direction and is perpendicular to the plane created by the rear surface 148 of the front panel 130.

The third portion 156 extends downwardly in a third direction 162 as indicated by the arrow in FIG. 9. The third portion 156 may correspond to the downward facing lip 155. The third direction 162 is different from the second direction 160. In the embodiment shown in FIG. 9, the third direction 162 extends downwardly and back towards the rear surface 148 of the front panel 130. Thus, in the embodiment shown, the second portion 154 and third portion 156 form an acute angle.

Figure 10:
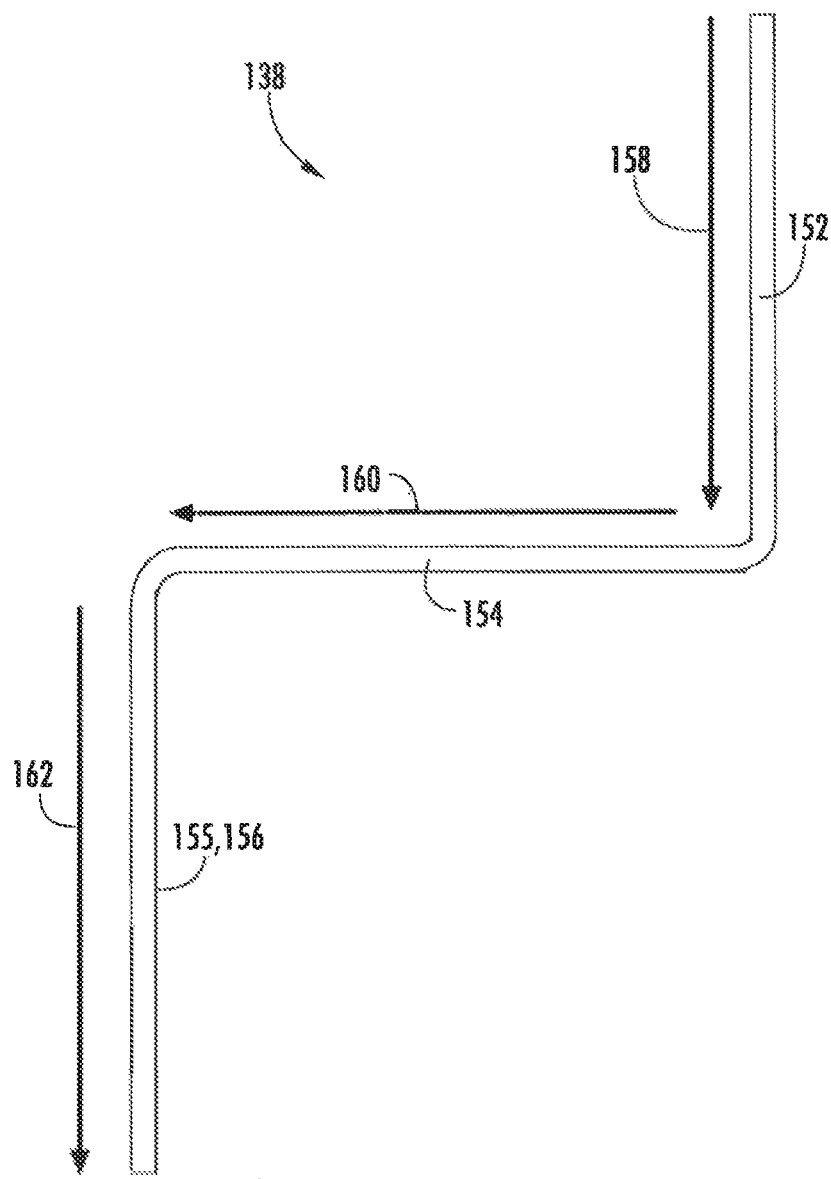
FIG. 10 is a side, cross-sectional view of an embodiment of a first mount.
Figure 11:
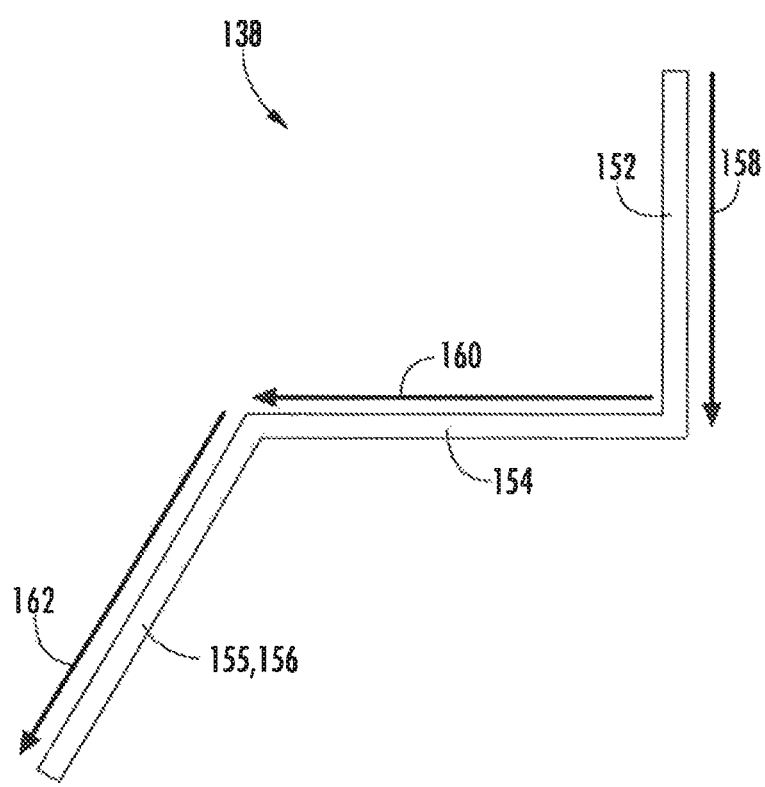
FIG. 11 is a side, cross-sectional view of another embodiment of a first mount.
Figure 12:
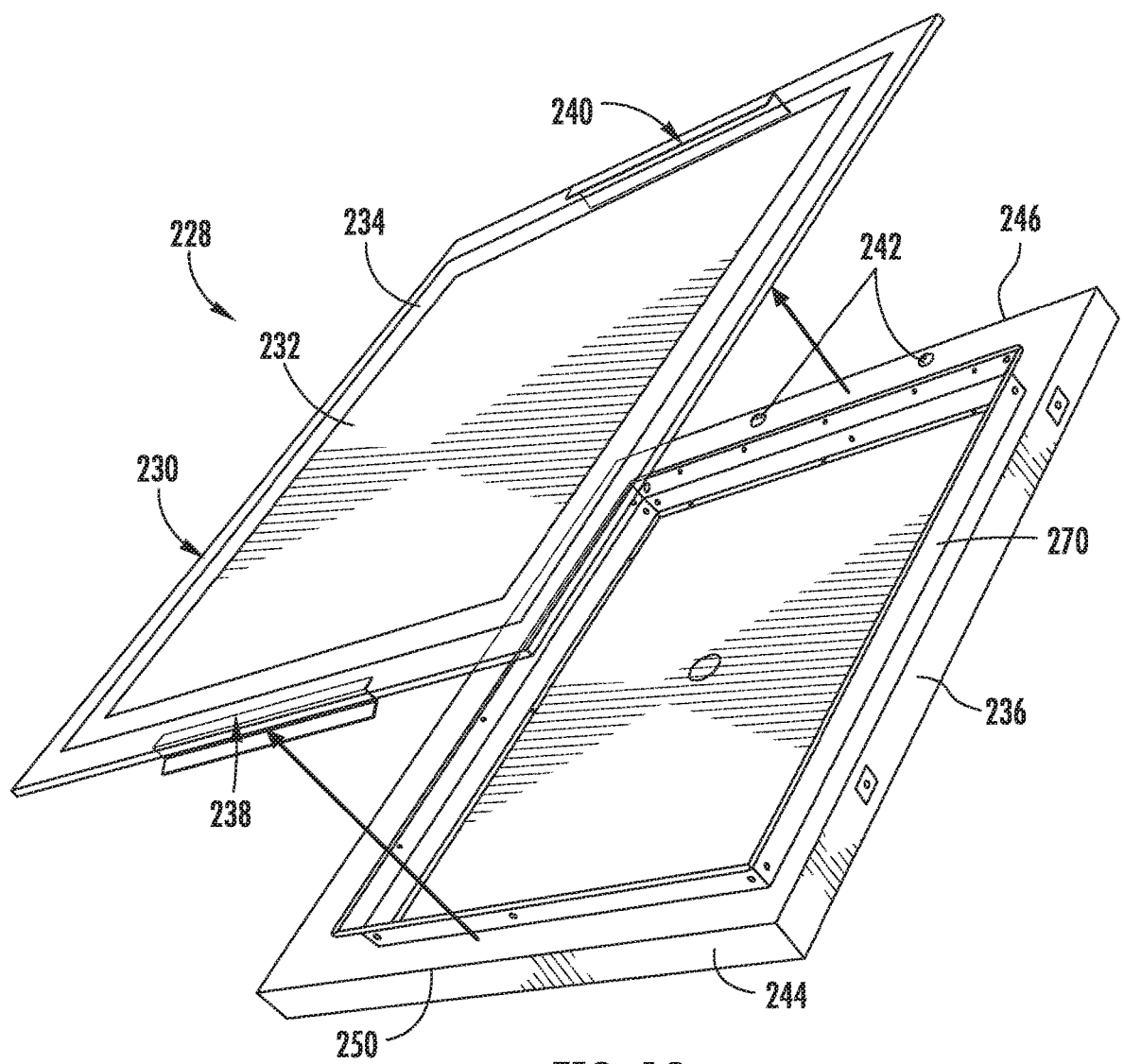
FIG. 12 is a perspective, assembly view of the illuminated vanity mirror.

In other embodiments, the third direction 162 can be such that second portion 154 and the third portion 156 form a right angle or an obtuse angle. For instance, as shown in FIG. 10 the third portion 156 extends perpendicularly from the second portion 154. As shown in FIG. 11, the third portion 156 extends at an obtuse angle relative to the second portion 154.

The first portion 152, the second portion 154, and the third portion 156 of the first mount 138 can be integrally formed. Alternatively, these portions of the first mount 138 may be discrete components that are attached together.

As shown in FIGS. 7-9, the first mount 138 can extend through the cavity 150 of the first wall 144 and may extend into the mirror housing 136. Some portion of the first mount 138 may extend into the chamber 172 where light shines from the light sources and exits through the illumination portion(s) 134 of the front panel 130. However, preferably only a small amount or portion of the first mount will extend into this chamber to avoid interference with the lighting.

For instance, the mirror housing 136 can have a depth D. The first mount 128 may extend a distance that is no more than about 50% of the depth of the mirror housing, such as no more than about 30% of the depth of the mirror housing, such as no more than about 20% of the depth of the mirror housing.

In one example embodiment, the first mount 138 will not extend further than about 1.5 inches into the mirror housing 136. In another example embodiment, the first mount 138 will not extend further than about 0.75 inches into the mirror housing 136.

In the embodiments shown in FIG. 9-11, the first mount 138 possesses a first portion 152, a second portion 154, and a third portion 156. However in other embodiments, the first mount may include only two portions or it may include more than three portions.

FIGS. 12-15 depict another example embodiment of the present disclosure where the first mount is received within a cavity that is defined by the bottom wall of the mirror housing. In this example embodiment, a front panel 230 is attached to the mirror housing 236 to form the overall illuminated vanity mirror assembly 228. A first mount 238 and a second mount 240 are attached to a rear surface 248 of the front panel 230. The first mount 238 is attached at or adjacent to a first edge 239 of the rear surface 248 of the front panel 230 and the second mount 240 is attached at or adjacent to a second edge 241 of the rear surface of the front panel.

Figure 13:
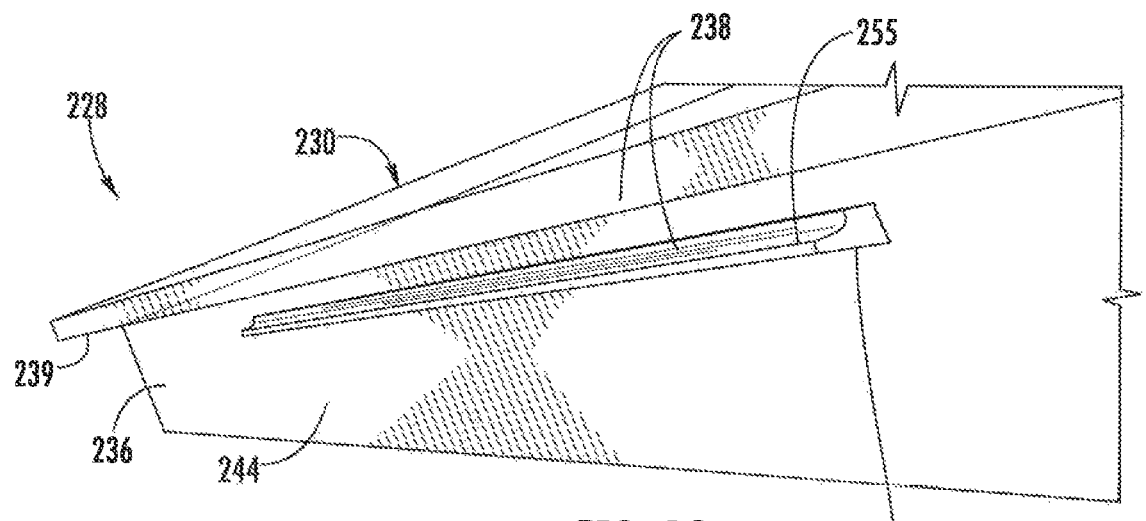
FIG. 13 is a perspective view of the first mount being received within a cavity defined within the bottom wall of the housing.
Figure 14:
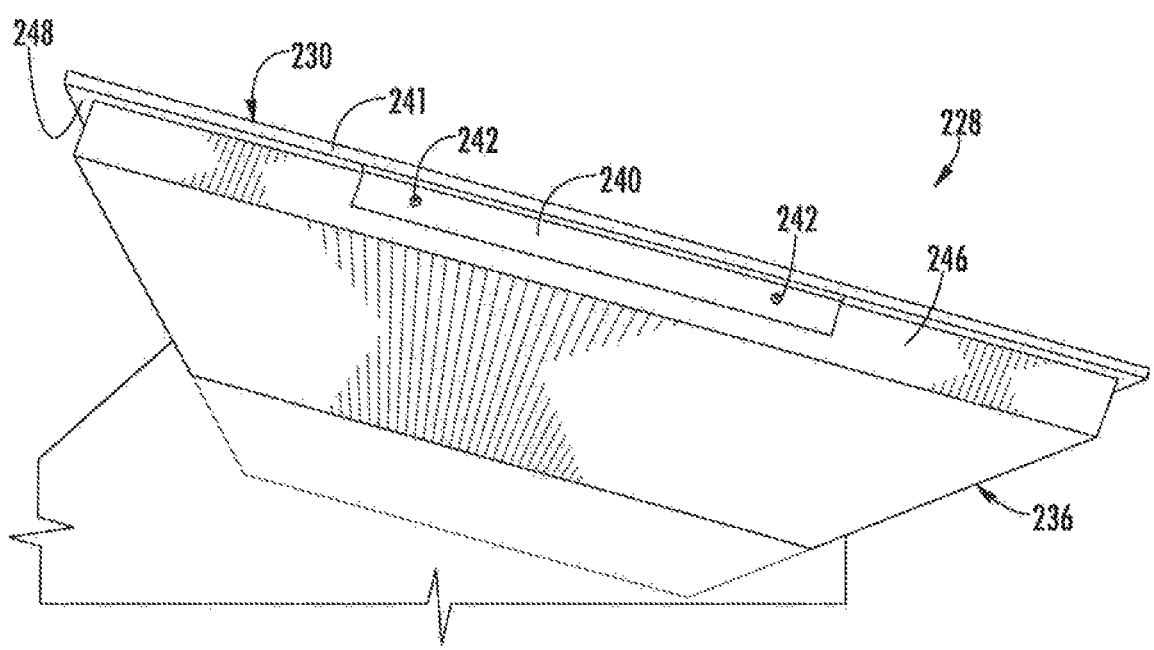
FIG. 14 is a perspective view showing the second mount and its connection with the top wall of the housing.
Figure 15:
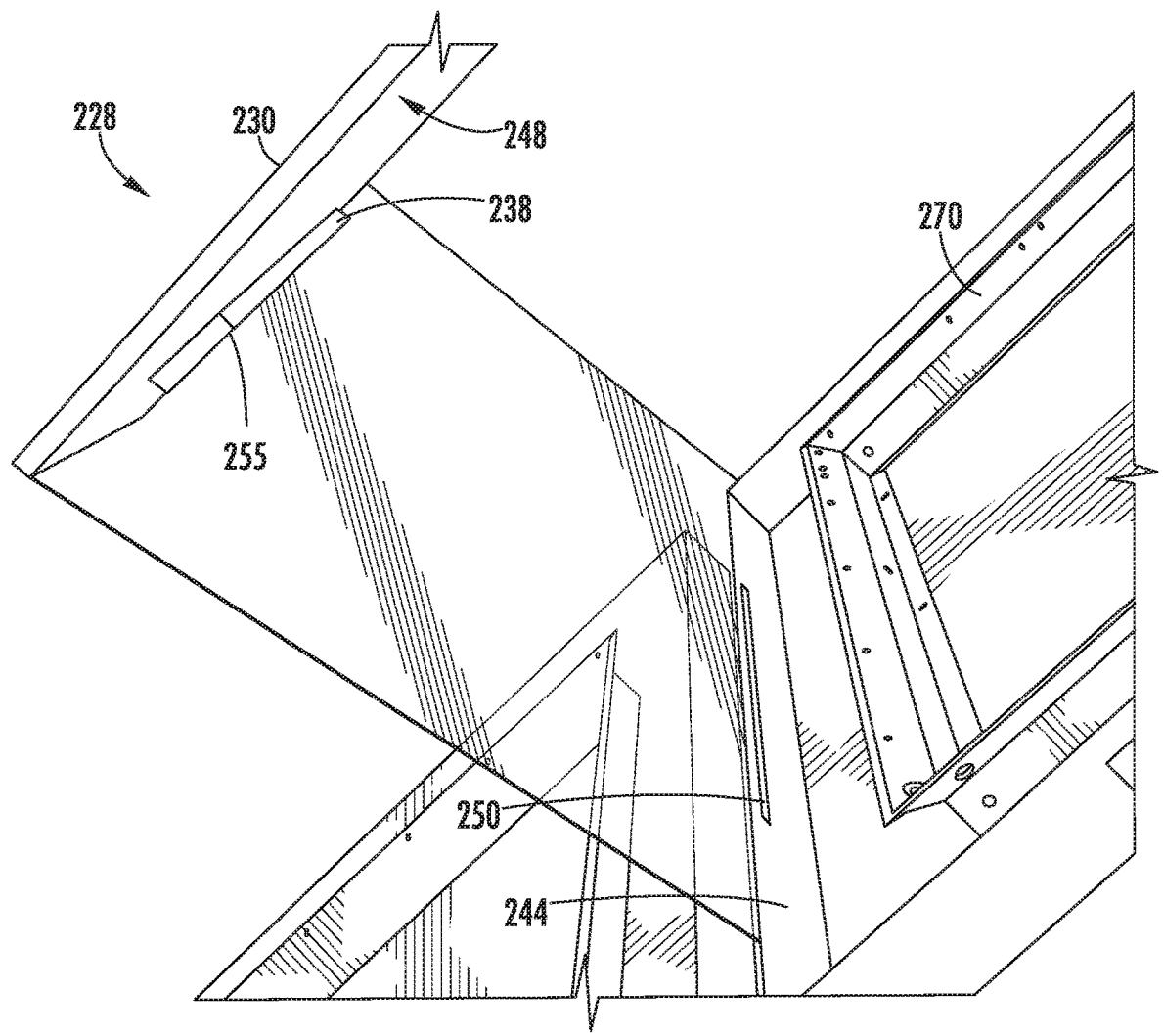
FIG. 15 is a perspective view of the front panel removed and offset from the mirror housing, showing the cavity and the first mount.

In the embodiment shown in FIGS. 13 and 14, the first edge 239 corresponds to a bottom edge of the rear surface 248 of the front panel 230 and the second edge 241 corresponds to a top edge. However, in other embodiments, the first edge 239 may correspond to a top edge of the rear surface 248 of the front panel 230 and the second edge 241 may correspond to a bottom edge. These attachments may be accomplished through a variety of ways, including, but not limited to, fasteners, adhesives, snap connections, etc. Alternatively, the first and/or second mount(s) 238, 240 may be formed integrally with the rear surface 248 of the front panel 230.

The mirror housing 236 can possess a first wall 244 and a second wall 246. In FIGS. 13 and 14, the first wall 244 can be a bottom wall of the mirror housing 236 and the second wall 246 can be a top wall of the mirror housing 236. However, in other example embodiments, the first wall 244 may be the top wall and the second wall 246 may be the bottom wall.

The first wall 244 will define a cavity 250. A portion of the first mount 238 will be physically received within the cavity 250 of the first wall 244. In FIG. 13, a downward facing lip 255 on the first mount 238 is the portion that is physically received within the cavity 250. In some embodiments, the cavity 250 will be of a size and shape that is sufficiently large so that a portion of the first mount 238 can be received within the cavity but small enough to secure a portion of the first mount in a fixed position. By securing the first mount 238, the attached front panel 230 may also be held in a fixed position or a relatively fixed position.

As shown in FIG. 14, the second wall 246 of the mirror housing 236 may be connected or attached to the second mount 240. In FIG. 13, fasteners 242 are used to secure the second mount 240 to the second wall 246 of the mirror housing 236. The fasteners 242 in FIG. 14 are screws that extend through holes within the second mount 240 and the second wall 246. However, other connection methods can be used without deviating from the scope of the present disclosure, such as a snap connection, nuts and bolts, etc. In FIG. 14, two fasteners 242 are used, but more or fewer fasteners may be used. In some embodiments, the fasteners 242 can be spaced evenly along the second mount 240. However, the fasteners 242 may secure the second mount and the second wall 246 at any location along the second mount. In addition to or as an alternative to applying fasteners 242 to a second wall 246, fasteners may be applied to side walls or other surfaces of the mirror housing 236 to secure the front panel 230.

Figure 16:
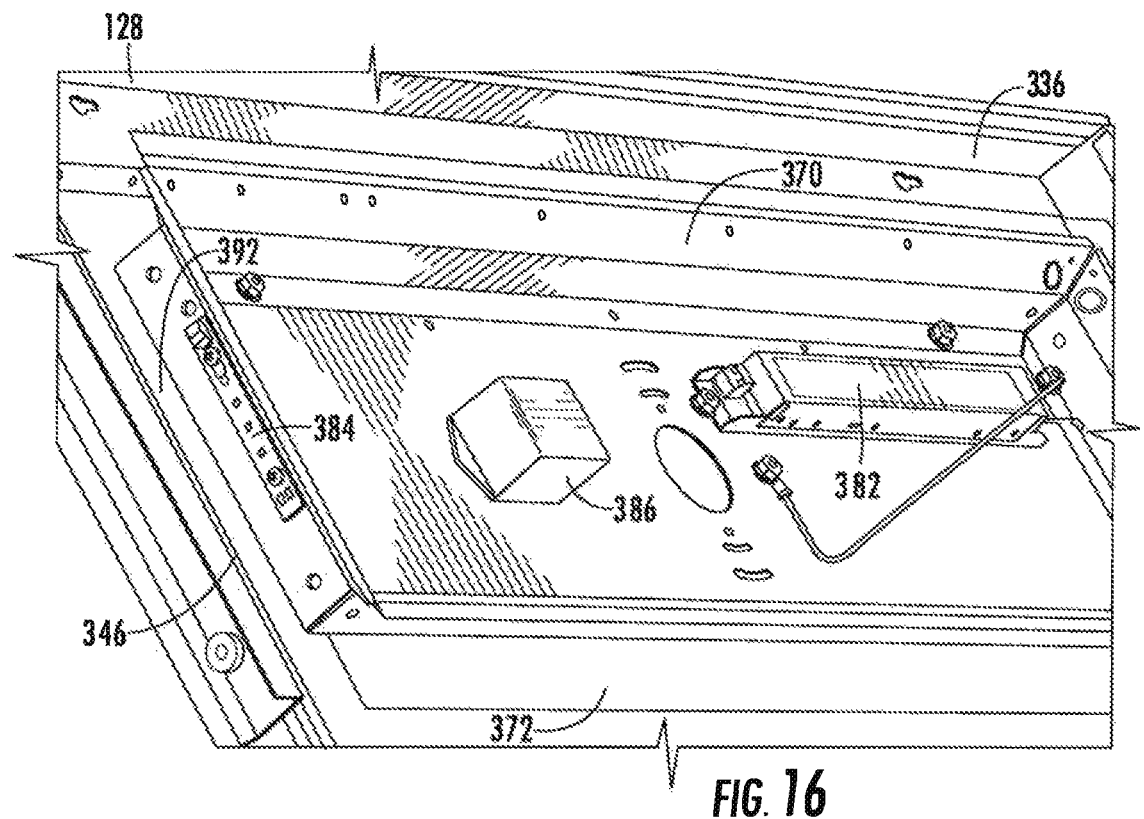
FIG. 16 is a perspective view of one or more light sources disposed within the mirror housing according to an exemplary embodiment.
Figure 17:
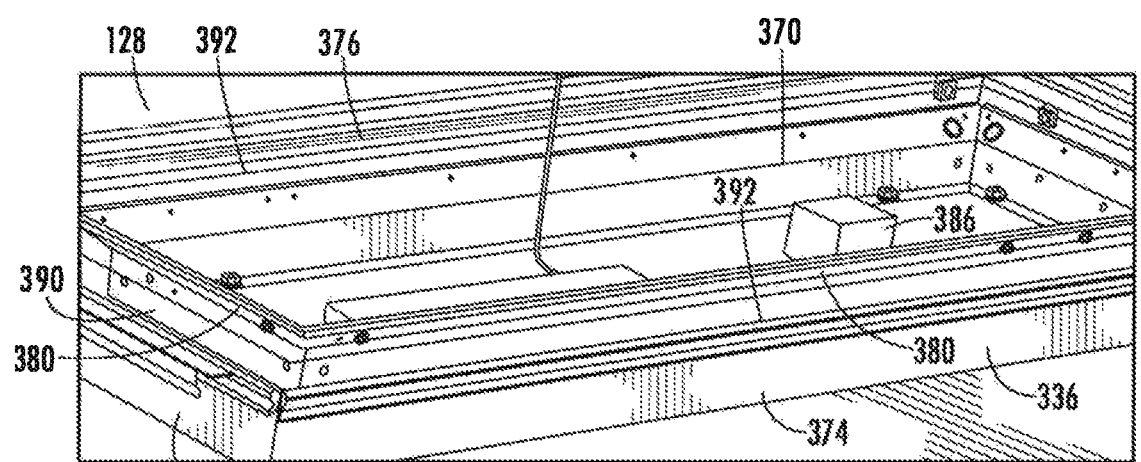
FIG. 17 is another perspective view of the one or more light sources of FIG. 16.

In the embodiment shown in FIGS. 16 and 17, the one or more light source(s) include a first light source 380 and a second light source 384. For instance, the first light source 380 can be controlled by a first driver 382 and the second light source 384 can be controlled by a second driver 386. The first driver 382 and second driver 386 can be configured to illuminate the first light source 380 and second light source 384 independently and/or coincidentally. For example, the first driver 382 and second driver 386 can be controlled independently so that only the first light source 380 is illuminated, only the second light source 384 is illuminated, and/or coincidentally so that both and/or neither the first light source 380 and/nor the second light source 384 are illuminated.

For instance, the first light source 380 can be positioned to illuminate a first portion 390 of the chamber 372. For example, the first light source 380 can be positioned along an internal bracket 370 to illuminate a first portion 390 of the chamber 372. The second light source 384 can be positioned to illuminate a second portion 392 of the chamber 372. For example, the second light source can be positioned along the internal bracket 370 to illuminate the second portion 392 of the chamber 372. The first light source 380 and/or the second light source 384 can additionally or alternatively be positioned along one or more other suitable surfaces within a mirror housing 336, such as walls 344, 346, 374, 376 and/or a back of the mirror housing 336. The first portion 390 and second portion 392 may be distinct portions and/or may overlap. For example, the first portion 390 may be a portion adjacent to a first wall 344, a third wall 374, and a fourth wall 376 and the second portion 392 may be a portion adjacent to a second wall 346. For example, the first light source 380 may be positioned along the portions of the internal bracket 370 that are parallel to the first, third, and fourth walls 344, 374, 376 and the second light source 384 may be positioned along the portion of the internal bracket 370 that is parallel to the second wall 346. Thus, illuminating the second light source independently can illuminate the illumination portion 134 adjacent to the second wall 346 and illuminating the first and second light sources 380, 384 coincidentally can illuminate the entire illumination portion 134.

As another example, the first portion 390 may comprise the entire chamber 372 and the second portion 392 may comprise a portion of the chamber 372 that is also part of the first portion 390. For example, the first light source 380 may be positioned around most of or the entire internal bracket 370 to illuminate most of or the entire illumination portion 34 without requiring the second light source 384 to be illuminated coincidentally. The second light source 384 can then be positioned along a portion of the internal bracket 370 that includes some of or the entire first light source 380. For example, the second light source 384 can be positioned closer to and/or farther from the illumination portion 34 than the first light source 380. As another example, the second light source 384 can be positioned at a similar distance from the illumination portion as the first light source 380 and be integrated into a same structure as the first light source 380. For example, a string of LEDs comprising LEDs connected to the first driver 382 and LEDs connected to the second driver 386 can be attached to the portion of the internal bracket 370 that includes the first and second light sources 380, 384.

The second light source 384 can be illuminated independently to provide a lower light level on one or more reflective surface(s) 132 than when the first light source 380 is illuminated independently or coincidentally with the second light source 384. For example, the second light source 384 can be illuminated in a nighttime operating mode or low-light operating mode. For instance, the lower light level can be more aesthetically and/or functionally pleasing to an individual using the illuminated vanity mirror assembly 128. For example, the first and second light sources 380, 384 can be controlled using switches, such as separate light switches or a main switch and/or auxiliary switches. As another example, the first and second drivers 382, 386 can be connected to a control system configured to control illumination of the first and second light sources 380, 384. For example, the control system can illuminate the second light source 384 independently in response to a signal from a clock (e.g. indicating a nighttime hour), light sensor (e.g. indicating low levels of ambient light), or other suitable sensor, or combination thereof.

In the example embodiments shown, the front panel 230, 330 possesses a rectangular shape. Other components of the assembly such as the first and second mount, the illumination surface(s) 134, 234 of the front panel, and the internal bracket 170, 270 of the mirror housing are modified to accommodate this shape. This embodiment allows light to shine along the perimeter of the front panel so that the light shines evenly when someone looks into the central reflective surface 132, 232. However in other embodiments, the front panel may possess a circular shape, an oval shape, a polygon shape or any other shape. Accordingly other components and the assembly may be altered to accommodate the shape of the front panel. For example, if a circular front panel were used, then a circular internal bracket and a circular illumination portion on the front panel could be used. However, the illumination portion may have any shape and does not have to be formed around the perimeter of the front panel.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. An illuminated vanity mirror comprising:
   a housing;
   a front mirror panel connected to the housing;
   a frame connected to the housing and positioned behind the front mirror panel; and
   a light emitter connected to frame, wherein the light emitter includes a plurality of LEDs facing away from the front mirror panel,
   wherein the LEDs are positioned to direct emitted light toward the housing and wherein the emitted light is redirected through the front mirror panel, wherein the frame includes a first side wall and a second side wall extending from the first side wall at an oblique angle, and wherein the light emitter is connected to the second side wall.

2. The illuminated vanity mirror of claim 1, wherein the housing reflects the emitted light toward the front mirror panel.

3. The illuminated vanity mirror of claim 1, wherein the housing includes a rear wall and an outer wall extending from the rear wall.

4. The illuminated vanity mirror of claim 1, wherein the emitted light is mixed prior to passing through the front panel to be substantially free of pixilation.

5. The illuminated vanity mirror of claim 1, further comprising a second light emitter, wherein the second light emitter is configured to provide a lower light level than the light emitter.

6. The illuminated vanity mirror of claim 3, wherein the emitted light strikes the outer wall prior to striking the rear wall.

7. The illuminated vanity mirror of claim 5, wherein the light emitter is connected to a first driver and the second light emitter is connected to a second driver.

8. An illuminated vanity mirror comprising:
a housing having a rear wall and a set of outer walls extending from the rear wall to define an interior compartment;
a front mirror panel connected to the housing;
a frame positioned in the interior compartment, the frame having a side wall oriented at an oblique angle to the rear wall and to the front mirror panel; and
a light emitter connected to the side wall, wherein the light emitter includes a plurality of LEDs facing away from the front mirror panel,
wherein the LEDs are positioned to direct emitted light toward the housing, and wherein the emitted light is reflected away from the housing toward the front mirror panel.

9. The illuminated vanity mirror of claim 8, wherein the frame includes a flange that engages the rear wall.

10. The illuminated vanity mirror of claim 8, wherein the housing is configured to reflect the emitted light toward the front mirror panel.

11. The illuminated vanity mirror of claim 8, wherein at least a portion of the emitted light strikes at least one of the outer walls prior to striking the rear wall.

12. The illuminated vanity mirror of claim 8, wherein the front mirror panel includes a mirrored section and a semi-transparent section.

13. The illuminated vanity mirror of claim 8, wherein the emitted light is mixed prior to passing through the front panel to be substantially free of pixilation.

14. An illuminated vanity mirror comprising:
a housing defining an interior compartment;
a front mirror panel connected to the housing;
a frame positioned in the interior compartment, the frame having a first side wall oriented at an oblique angle to the rear wall and to the front mirror panel;
a light emitter connected to the first side wall, wherein the light emitter includes a plurality of LEDs facing away from the front mirror panel,
wherein the LEDs are positioned to direct emitted light toward the housing and wherein the emitted light is mixed prior to being passing through the front mirror panel to be substantially free of pixilation.

15. The illuminated vanity mirror of claim 14, wherein the emitted light is reflected by the housing.

16. The illuminated vanity mirror of claim 14, wherein the frame includes a second, third, and fourth sidewall, and wherein light emitters are positioned along the entire length of the first, second, third, and fourth sidewalls.

17. The illuminated vanity mirror of claim 15, wherein the housing includes a rear wall and an outer wall extending from the rear wall.

18. The illuminated vanity mirror of claim 16, wherein the emitted light has a rectangular pattern.

19. The illuminated vanity mirror of claim 17, wherein a space is defined between an outer edge of the frame and the outer wall, and wherein the emitted light is reflected through the space toward the front mirror panel.

* * * * *